UNITED STATES PATENT OFFICE.

HOWARD L. MARSH, OF PHILADELPHIA, PENNSYLVANIA.

PROCESS OF INTRODUCING IRON INTO FOODS, DRUGS, AND BEVERAGES.

1,171,739.   Specification of Letters Patent.   Patented Feb. 15, 1916.

No Drawing. Original application filed December 5, 1914, Serial No. 875,553. Divided and this application filed January 27, 1915. Serial No. 4,608.

*To all whom it may concern:*

Be it known that I, HOWARD L. MARSH, a citizen of the United States, residing at Philadelphia, county of Philadelphia, and State of Pennsylvania, have invented a new and useful Improvement in Processes of Introducing Iron into Foods, Drugs, and Beverages, of which the following is a full, clear, and exact description.

The object of my invention is to introduce iron into beverages, medicines and foods. The introduction of iron into such substances through the medium of inorganic compounds of iron is old and well known; but the serious objections thereto have been so well established and recognized and the supposedly good effects have been counterbalanced by such demonstrably harmful results that this method is generally deemed antiquated and impracticable. Other methods of introducing iron into substances intended for human consumption have been devised which avoid the particular deleterious effects produced by inorganic iron compounds. Thus, solutions of compounds of iron and carbo-hydrates, and particularly a solution of the substance commonly known as ferric saccharate, have been utilized as agents for the introduction of soluble iron into foods, drugs and beverages; but this method is open to other objections, chief among which is that there is produced a turbidity or precipitate of both the iron and some of the ingredients of the beverage. This effect is probably due to the fact that a solution of ferric saccharate is not only colloidal but impure, since there is more or less free alkali present. Further, a solution of ferric saccharate possesses a pronouncedly sweetish taste, which is objectionable in most instances and prohibitive in some.

The object of my invention is to produce a substance which will produce little or no turbidity or precipitation when added in any quantity to most beverages, and in which the sweetish taste is eliminated or removed to a substantial extent.

To effect my object I take a more or less concentrated solution of ferric saccharate, which preferably contains as little as possible of free alkali, and heat it under pressure to a high temperature. If the ferric saccharate originally contains free alkali in any substantial quantity, it should preferably be first neutralized. A specific example of my process is as follows: 100 cc. of an 85 per cent. solution of ferric saccharate is heated in an autoclave to a temperature of about 300 degrees F. for a period of about one minute. This treatment results in the production of a substance containing, as I believe, iron in combination with some of the organic acids derived from breaking down the sugar molecules and has the characteristics above named. The sweetish taste is largely or wholly removed, and while it possesses, when freshly prepared, a slight odor of burnt sugar, this disappears upon dilution. If the beverage to which it is added is filtered, there is no loss of iron, which remains in solution. When added to most beverages, there is no turbidity or precipitation, and filtration is unnecessary.

In place of heating a solution of ferric saccharate, I may heat a sugar solution of freshly precipitated ferric hydroxid, which, so far as my process is concerned, may be regarded as an equivalent of ferric saccharate.

The successful practice of the process does not require for the heating step any precise degree of temperature continued for any definite time. Thus, with a lower temperature than that specified, but with the heating continued for a relatively longer time, the same result may be secured. So, also, the heat treatment may be carried on at a somewhat higher temperature, in which case the time required would be relatively short. Again, I have found that a dilute solution of ferric saccharate requires either a higher temperature or a temperature maintained for a longer time, than does a stronger solution. Furthermore, if the product has caramelized and undergone a considerable change by reason of relatively great heat treatment, it is essentially the same for the purpose desired as a product which has caramelized to a very slight extent. Judging from experience, however, I would say that the range of permissible temperature would be between 212 degrees and 350 degrees Fahrenheit with the corresponding steam pressure, and that the greater the strength of the solution, the less the temperature required and the shorter the duration of the heat treatment.

This application is a division of an application filed December 5, 1914, Serial No. 875,553.

Having now fully described my invention, what I claim and desire to protect by Letters Patent is:

1. The process of preparing a substance containing iron in a soluble form for introduction into beverages, foods and drugs, which consists in subjecting a solution of ferric saccharate to a temperature between 212 and 350 degrees F. and under a pressure exceeding normal atmospheric pressure.

2. The process of preparing a substance containing iron in a soluble form for introduction into beverages, foods, and drugs, which consists in heating ferric saccharate under pressure to a temperature of approximately 300 degrees F.

3. The process of preparing a substance containing iron in a soluble form for introduction into beverages, foods and drugs, which consists in subjecting a solution of ferric saccharate containing substantially no free alkali, to a temperature between 212 and 350 degrees F. and under a pressure exceeding normal atmospheric pressure.

In testimony of which invention, I have hereunto set my hand, at Philadelphia, on this 25th day of January, 1915.

HOWARD L. MARSH.

Witnesses:
M. M. Hamilton,
E. E. Wall.